United States Patent [19]

Karwowski

[11] Patent Number: 4,614,664
[45] Date of Patent: * Sep. 30, 1986

[54] PROCESS OF PREPARING INSTANT, FLAKED, WHEAT FARINA

[75] Inventor: Jan Karwowski, Franklin Lakes, N.J.

[73] Assignee: Nabisco Brands, Inc., Parsippany, N.J.

[*] Notice: The portion of the term of this patent subsequent to Nov. 5, 2002 has been disclaimed.

[21] Appl. No.: 751,049

[22] Filed: Jul. 2, 1985

Related U.S. Application Data

[63] Continuation of Ser. No. 531,983, Sep. 14, 1983, Pat. No. 4,551,347.

[51] Int. Cl.$^4$ .............................................. A23L 1/164
[52] U.S. Cl. .................................... 426/621; 426/457; 426/573
[58] Field of Search ............... 426/621, 573, 457, 619, 426/72, 74

[56] References Cited

U.S. PATENT DOCUMENTS

| | | |
|---|---|---|
| 201,878 | 4/1878 | Grivel . |
| 1,111,917 | 9/1914 | Odegard . |
| 1,163,175 | 12/1915 | Rullman . |
| 1,933,158 | 10/1933 | Bohn et al. ......................... 426/621 |
| 2,131,450 | 9/1938 | McKay ............................... 426/621 |
| 2,278,465 | 9/1938 | Musher ................................. 99/83 |
| 2,653,101 | 9/1953 | Carman et al. .................... 426/621 |
| 2,890,118 | 6/1959 | Cantor et al. ......................... 99/83 |
| 2,999,018 | 9/1961 | Huffmann et al. ..................... 99/83 |
| 3,058,828 | 10/1962 | Lindblad .............................. 99/23 |
| 3,185,574 | 5/1965 | Gabby et al. .......................... 99/86 |
| 3,336,139 | 8/1967 | Mech et al. .......................... 99/124 |
| 3,431,112 | 3/1969 | Durst .................................... 99/1 |
| 3,434,843 | 3/1969 | Durst .................................... 99/1 |
| 3,526,512 | 9/1970 | Collins et al. .......................... 99/83 |
| 3,526,513 | 9/1970 | Hyldon ................................. 99/83 |
| 3,526,514 | 9/1970 | Gralak et al. .......................... 99/83 |
| 3,664,846 | 5/1972 | Hyldon ................................. 99/83 |
| 3,664,847 | 5/1972 | Hyldon ................................. 99/83 |
| 3,787,584 | 1/1974 | Hyldon ............................... 426/208 |
| 3,814,819 | 6/1974 | Morgan ............................... 426/72 |
| 3,974,295 | 8/1976 | Gralak ................................ 426/72 |
| 4,006,254 | 2/1977 | Gralak ................................ 426/72 |
| 4,006,255 | 2/1977 | Gralak ................................ 426/72 |
| 4,348,379 | 9/1982 | Kowalsky et al. ................... 424/34 |

FOREIGN PATENT DOCUMENTS 3239 of 1900 United Kingdom .

OTHER PUBLICATIONS

Irie, Noboru, et al., "The Effects of Guar Gum on Postprandial Chylomicronema", Nutrition Reports Inter., vol. 26, No. 2, (Aug. 1982), pp. 207 to 214.
Jenkins, David J. A., et al., "Effect of Pectin, Guar Gum and Wheat Fibre on Serum-Cholesterol",—The Lancet, (May 17, 1975), pp. 1116 to 1117.
Poplin, Loyd E., "Diabetes that First Occurs in Older People", Nutrition Today, (Sep.-Oct. 1982), pp. 4 to 13.
Balascio, J. R. et al., "Degradation of Guar Gum by Enzymes Produced by a Bacterium from the Human Colon", J. of Food Biochem., vol. 5 (1981-Copyright 1982), pp. 271 to 282.
Iwasaki, Yoshifumi, et al., "Guar Jelly for the Treatment of Diabetes Mellitus in Humans", Nutrition Reports Inter., vol. 26, No. 2, (Aug. 1982), pp. 203-206.
Jenkins, David J. A., et al., "Dietary Fiber and Blood Lipids: Treatment of Hypercholesterolemia with Guar Crispbread," Am. J. of Clinical Nutrition, vol. 33, (Mar. 1980), pp. 575 to 581.
Jenkins, David J. A., "Guar Crispbread in the Diabetic Diet", British Med. J., vol. 2, (Dec. 1978), pp. 1744 to 1746.
Johnson et al., Encyclopedia of Food Technology, (1974), p. 127.

*Primary Examiner*—George Yeung
*Attorney, Agent, or Firm*—Richard Kornutik

[57] ABSTRACT

Process of preparing a dry, instant, wheat or farina-like product in flake form which will readily rehydrate upon the addition of hot water. Farina and an effective amount of guar gum in powder form are admixed. The homogeneous mixture is impregnated with a sufficient amount of water to saturate the mixture. The mixture is tempered, preferably with agitation, to produce a material having uniform moisture. The tempered material is cooked, the average particle size of the cooked material being increased thereby. The average particle size of the cooked material is then reduced. The particulate, cooked material is dried. The dry, particulate material is then tempered to provide a uniform moisture content. The tempered, particulate material is flaked to form a dry product in flake form, which is capable of being readily rehydrated by the addition thereto of hot water to provide a food product having the texture, etc., of cooked farina.

1 Claim, No Drawings

PROCESS OF PREPARING INSTANT, FLAKED, WHEAT FARINA

This is a continuation of application Ser. No. 531,983, filed on Sept. 14, 1983, now U.S. Pat. No. 4,551,347.

BACKGROUND OF THE INVENTION

1. Field of the Invention

The invention relates to processes of preparing instant wheat cereals. The invention also relates to instant or ready-to-eat wheat cereals.

2. Prior Art

Ready-to-eat cereals are available in a variety of forms and are normally consumed with milk and sometimes sugar. Flaked varieties are very popular. During processing the starch is gelatinized, halting enzymic reactions and thus providing product stability and good shelf life.

Guar gum is a plant seed gum. Guar gum is obtained from the seeds of the leguminous plant Cyamopsis tetragonolobus. The seeds after harvesting, are processed by dehulling and milling. In such process the gum-containing fractions are enriched by differential milling. The final form of the gum is a fine powder which contains about 80 percent guar galactomannan. Guar gum is a straight chain polymer of D-mannopyranose with one unit length D-galactopyranose substituents on every second mannopyranose unit. The molecular weight of guar gum is in the range of 200,000 to 2,000,000. Guar gum hydrates easily in cold water and yields highly viscous colloidal solutions. The heating of an aqueous dispersion of guar increases the rate of hydration, but on prolonged exposure to elevated temperatures the viscosity may decrease. The rate of hydration of guar gum is also dependent on the pH range of the aqueous dispersion. Guar, being nonionic, is little affected by salt additives; however, polyvalent cations can cause precipitation at certain pH levels. Like most hydrocolloid solutions, guar also is sensitive to molecular degradation; consequently, some precautions are indicated in handling such material. Sugar solutions considerably influence the hydration of guar.

Guar gum is used as a food additive for water binding. It is commonly used in ice cream, cakes, pie fillings, cheese spreads, vegetable fat toppings, cottage cheese creaming mixtures, canned goods, baby foods, beverages and icings. Guar is also an effective emulsion stabilizer.

The Food and Drug Administration has classified guar as a generally-recognized-as-safe (GRAS) substance for intentional use as a food additive, in the current estimated daily adult dose of 1.9 gm.

U.S. Pat. No. 2,890,118 discloses a method of forming a quick-cooking cereal product. At the start of the process, a dry-milled wheat farina, which has a moisture content of below about 14 percent by weight is formed. The process includes adding to such farina with agitation about ½ to 2½ percent by weight of a thickening and suspending agent. the suspending agent can be gum tragacanth, gum karaya, gum arabic, purified gum guar, agar or refined algin. The resultant mixture is heated until it is sterile.

U.S. Pat. No. 2,278,465 discloses a process of preparing an improved high starch food piece. The process includes boiling the high starch food piece in a concentrated sugar solution, removing the excess sugar solution therefrom and then allowing the surface sugar to dry thereon. The high starch food can be farina. A quick-cooking cereal is produced.

Johnson et al., Encyclopedia Of Food Technology, (1974), p. 127, discloses that "quick" oatmeal uses oat groats that are steel-cut into several fragments after dehulling, and then flattened a little thinner than for regular rolled oats, to reduce the time of preparation. Instant or "cook in the bowl" oatmeal is prepared in such a way that the user need only add hot water and stir to make the product for consumption. Based on quick oatmeal, it is given some additional treatment—such as the incorporation of 0.1 to 1.0 percent of an edible gum on the surface of the oat particles—to improve its hydration.

U.S. Pat. No. 3,526,513 discloses producing an instant wheat farina denaturing wheat farina and adding the denatured farina to critical amounts of a thickening agent and water. The mixture is cooked on a drum drier. The cooked, dried product is comminuted. The thickening agent can be guar bean gum.

U.S. Pat. No. 3,526,514 discloses producing a flavored, instant grain product by denaturing a grain such as corn, rice, barley or wheat, and adding the denatured grain to critical amounts of a thickening agent, water and critical amounts of either fruit preserves, fruit juice or pulped fruit. The mixture is cooked on a drum drier. The cooked dried product is comminuted. The thickening agent can be guar bean gum.

U.S. Pat. No. 1,163,175 discloses a dried, granulated food product composed of wheat cereal particles with gelatinized agar-agar adhered thereto.

The use of guar gum in the known dry, instant, farina products (cereals) causes a lumping problem in the cereals upon rehydration or reconstitution.

BROAD DESCRIPTION OF THE INVENTION

An object of the invention is to provide a process for preparing an instant, flaked, wheat farina-like product which can be rehydrated by the mere addition thereto of hot water. Another object of the invention is to provide an instant, flaked, wheat farina-like product which has excellent flavor and texture characteristics and can be rehydrated by merely adding water thereto. Other objects and advantages of the invention are set out herein or are obvious herefrom to one ordinarily skilled in the art.

The objects and advantages of the invention are achieved by the process and product of the invention.

The invention involves a process for preparing a dry, instant, wheat farina-like product in flake form which will readily rehydrate with hot water. The process includes admixing farina or farina-type material and an effective amount of guar gum in powder form. Purified guar gum is preferably used. The homogeneous mixture is impregnated with a sufficient amount of water to saturate the mixture. The mixture is tempered to produce a material at uniform moisture. The tempered material is sufficiently cooked to gel the starch present in the farina. The cooking increases the average particle size of the material, when compared to uncooked product. The average particle size of cooked material is then reduced, and the particulate, cooked material is dried. The dry, particulate material is tempered to provide a uniform moisture throughout the particle. The tempered, particulate material is flaked to form a dry product in flake form. The dry, flake product is capable of being readily rehydrated or reconstituted by the addition thereto of hot water or a hot liquid containing water. The dry, flaked, instant, wheat farina-like product upon rehydration has the flavor and texture characteristics and physical appearance of cooked farina. The rehydrated flake product is appetizing and readily digestible.

As used herein the terms "instant" and "ready-to-eat" mean a product that does not require a cooking step by the consumer, i.e., a product that can be prepared for use simply by adding hot water to it and mixing it in a cereal bowl.

The guar gum unexpectedly has produced several important processing and product features in the invention that are apparently not produced by other thickening agents, such, as other natural and synthetic gums. The use of guar gum in dry, farina-like products, such as wheat middlings, provides a very soft, slippery texture in the reconstituted product. However, a problem with the addition of guar to such known instant cereals is the occurrence of lumping upon rehydration or reconstitution. The invention process unexpectedly avoids or prevents lumpiness upon rehydration of the invention product containing guar gum. In the invention process, guar gum provides the best results, but other gums can be used.

In the following disclosure the letters in parenthsis refer to the steps of claim 1 below or the materials in such steps. Preferably 1 to 3 weight percent of guar gum, based on the total dry weight of mixture (a), is used. Most preferably about 1 weight percent of guar gum, based on the total weight of mixture (a), is used. Preferably the guar gum has an average particle size of 140 to 200 mesh (U.S. Standard), and the farina has an average particle size of 20 to 40 (U.S. Standard).

Mixture (a) is preferably impregnated with water by spraying mixture (a) with the water. Preferably mixture (a) is impregnated with 10 to 20 weight percent of water, based on the total dry weight of mixture (a).

Mixture (b) is tempered preferably at a temperature of 32° to 40° C. for about 15 to about 30 minutes. Preferably the tempering is achieved with agitation, which keeps the mixture free-flowing and provides a uniform distribution of the guar fum throughout the composition. The tempering shortens the time needed in the subsequent cooking step and provides better adherence of the guar to the farinaceous maerial.

Mixture (c) is cooked sufficiently to gel the starch present in the farina. Mixture (c) is cooked preferably at a temperature of 110° to 120° C., at a pressure of 10 to 15 p.s.i. and for 10 to 15 minutes. Mixture (c) is most preferably cooked at a temperature of about 120° C., at a pressure of about 15 p.s.i. and for about 12 minutes. the cooking increases the average particle size of mixture (c); preferably the increase in the average particule size is from number 12 to number 40 mesh (U.S. Standard). The particles are increased in size because the guar gum permits and helps achieve the formation of large granules.

The particle size reduction step eliminates the big lumps. Preferably the average particle size of cooked matrial (d) is reduced by means of grinding. Preferably the average particle size of cooked material (d) is reduced to less than 0.5 inch. Particulate material (e) is preferably dried at a temperature of 70° to 85° C. for 5 minutes to 10 minutes. Also preferably particulate material (e) is dried sufficiently toto reduce the water content of particulate material (e) to less than 14 weight percent.

Mixture (f) is tempered preferably at a temperature of 32° to 40° C. for about 15 to about 30 minutes. The purpose of the tempering is to achieve or assure a uniform moisture content throughout the particles of mixture (f). Preferably, a moisture content of about 13 percent is achieved during the tempering.

The flaking step forces the guar gum into the wheat particles. The flakes of the product preferably have an average thickness of 0.010 to 0.020 inch. Preferably the dry, flaked product is placed in sealed containers for storage. The total level of guar gum in the invention product preferably is about 2 percent by weight, based on the weight of the final composition. The invention method achieves uniform distribution of the guar gum throughout the composititon so that essentially no lumps are formed upon reconstitution or rehydration. The liquid used to reconstitute the dry, flaked product preferably is hot water or hot milk.

About 0.5 to 0.75 weight percent of additional guar gum, based on the total weight of flaked particulate material (h), is preferably added to flaked particulate material (h). Such addition of further guar gum is prefered so as to obtain rapid hydration in preparation for table use (which is reconstitution by the consumer). If too much guar gum is added, lumps develop upon reconstitution of the instant product. Preferably about 6 to 30 weight percent, based on the total weight of flaked particulate material (h), of at least one fortifying agent is added to flaked parriculate material (h).

The invention includes the dry, instant, wheat or farina-like product in flake form prepared by the processes of the invention. The instant product has excellent flavor and texture characteristics with good stability and shelf life. The instant product has a similar mouth feel, flavor, consistency and other organoleptic properties normally associated with conventional "hot" farina cereals requiring extended cooking while having the advantage of quick and convenient preparation by the consumer. The invention product avoids the prior art problems of scorching, lumping, sticking to the pan, etc. The invention wheat product can be taken from its sealed package, placed in a bowl, hot water or hot milk added, stirred lightly, sugar, cream and fruit added if desired, and then consumed.

The total amount of guar gum used in the invention is critical in order to avoid lumpiness in the rehydrated product.

DETAILED DESCRIPTION OF THE INVENTION

As used herein, all parts, percentages, ratios and proportions are on a weight basis unlelss otherwise stated herein or otherwise obvious herefrom to one ordinarily skilleld in the art.

The invention product is a ready-to-eat or instant cereal prepared from wheat farina or farina-like products, such as, wheat middlings. The wheat used must have been subdivided into the farina state. The farina used usually has an average particle size between about 20 and 40 mesh (U.S. Standard). The Federal Specification for farina requires that : 100 percent of the product pass through a US Standard No. 20 woven-wire-cloth sieve; not more than 10.0 percent pass through a U.S. Standard No. 45 sieve; and not more than 3.0 percent pass through a U.S. Standard No. 100 sieve.

Flour by-products, derived from the outer coverings of the wheat grain separated in extraction of the flour from the grain, are bran and the finer, more floury outer coverings are termed middlings. The middlings produced in flour milling, essentially small pieces of endosperm free from bran and germ, are termed farina. The composition of middlings can vary a great deal depending on the wheat used and the amount of endosperm present. In the manufacture of farina, it is necessary to use hard wheat as a raw material since soft wheat yields a product which becomes excessively pasty upon cooking. A typical wheat coarse middlings contains 19.0 percent of protein, 5.8 percent of fat, 65.0 percent of carbohydrates, 6.0 percent of fiber and 4.20 percent of ash. A typical wheat fine middlings contains 18.0 percent of protein, 3.9 percent of fat, 73.1 percent of carbohydrates, 2.2 percent of fiver and 2.8 percent of ash.

Guar gum, in dry form, is admixed with the dry farina or farina-like material. Any suitable mixing techniqye can be used. About 1 to 3 weight percent, preferably about 1 weight percent, of guar gum, based on the total dry weight of the admixture, is used. The guar gum usually has an average particle size between about 140 and 200 msh (U.S. Standard), and preferably about 170 mesh (U.S. Standard). Sufficient guar gum must be added to the rolled oats to produce a cooked flavor and texture when hot water is subsequently added to the mixure. If too much guar gum is added the resulting wheat product has a pasty texture upon additon of hot water. Guar gum is capable of hydraing rapidly with water, is edible, and is not cmpletely degraded by highly ionic substances such as sodium chloride. Guar gum is a plant mucilage which is soluble in water and swells in contact with water to form viscous colloidal solutions, and insoluble in oils, alcohol, benzene and other organic solvents. Guar gum as used within the scope of the invention does not have any undesirable flavor.

Edible grades of guar gum are used in the invention compositions. Guar gum powder provides a free flowing powder which is completely soluble in cold and hot water. Water solutions of guar gum are tasteless, odorless and nontoxic. Aqueous dispersions of guar gum are neutral.

The admixture at this stage in the process can also contain additional ingredients, such as vitamins, minerals, flavoring and antioxidants. Such additional ingredients shoud not usually be present in an amount greater than 40 weight percent, based on the total dry wieght of the admixture. Vitamins, if added duriing the invention process, are preferably added to a dry composition. Usually salt (NaCl) in the amount of about 0.5 to 4.0 percent by weight is added, although some of the NaCl can be replaced by Kcl.

Any type of mixing operation whcih can trhroughly mix the ingredients is sufficient.

The admixture of guar gum and farina is impregnated with water in an amount of about 10 to 20 weight percent, preferably about 13 weight percent, based on the total weight of the dry admixture. It is best to completely saturate the admixture even to the extent of visible excess water being present in the wetted admixture. The admixture should not be wetted to such an extent that it becomes a dispersion-solution. The admixture is preferably impregnated with water by spraying the water onto the admixture, although any other suitable water impregnation technique can be used.

The water-impregnated admixture is then tempered using any suitable tempering technique and equipment. For example, the tempering and agitation can be done in a ribbon blender or Hobart mixer. The tempering is usually dne at a temperature of 30°to 40° C. for 5 to 60 minutes and preferably at a temperature of 32° for about 15 to 30 minutes. The tempering can be done at, below or above atmospheric pressure. The tempering reduces the time required for the subsequent cooking step. The temperature and time of the tempering step does not allow setting or substantial gelatinizating of the starch present in the admixture components.

The tempered product is then cooked at a temperature of 110°120° C., at a pressure of 10 to 15 p.s.i. and for 10 to 15 minutes.

The cooking is preferably done at 15 p.s.i. for about 12 minutes. The cooking can be done using any suitable cooking technique and equipment, but preferably a pressure cooker is used. The cooking step means a heat treatment which causes a loss of bitefringence but is not so severe as to produce transparency of the farina particles. The cooking step is preferably accomplished using a rotating drum which is internally heated or using a simple retort. Exposure therein must be of sufficient temperature-time contacct so as to completely cook the product. The cooking should completely gelatinize the starch present in the composition. The cooked material is composed of particles which have increased to an average particle size of 6 to 60 mesh (U.S. Standard). The particle size increase is preferably achieved by agglomeration of the gum on the middlings particles using water through tempering and cooking.

The paricle size reduction step eliminates lumps and large agglomerates. The preferred particle size reduction technique is grinding, although the particle reduction can be done using any suitable particle size reduction technique and equipment. Preferably the product is passed through a grinder with an inserted screen designed for the reduction of the size of the particles of cooked material.

The particulate material is then dried or partially dried to a moisture content of 12 to 14 weight percent, preferably about 13 weight percent, based on the total dry weight of the composition. The drying can be done using any suitable drying technique and equipment.

The dried wheat material can be flaked using any suitable flaking equipment and method. Flaking is basically a process or step of flattening the dried wheat particles between rollers. For example, the dried wheat material can be flaked by passing it between large steel cylinders (180 to 200 revolutions per minute), with the rolls cooled by internal water circulation. Typically, screw conveyors or drag chain conveyors transport the dried wheat material composition to the flaking rolls. Just before falling into the large steel flaking rolls, the dried wheat material is tempered at about 90° to 100° F., and the wheat particles become plasticized. The pressure applied to the wheat material increases their diameter several times and decreases their diameter several times and decreases their thickness proportionately. When flaked wheat particles leave the rolls, the flakes contain about 10 to 14 percent moisture and are still slightly flexible.

After flaking, fortifying and other additives, flavoring, colorant, salt, sugars, minerals, wheat germ, cocoa, antioxidants and the like can be incorporated into the flaked wheat middlings. The additives include B-complex vitamins, malt, soluble iron compounds, vitamin A, vitamin C, BHA and BHT. Also, non-fat dry milk solids, (i.e., milk powder) or soybean protein may be added in amount sufficient to create a final protein level of up to 10 to 20 percent by weight.

Also after flaking, additional guar gum can be incorporated into the dried wheat powder. About 0.5 to about 1 weight percent, preferably about 0.8 weight percent, of guar gum, based on the total weight of the composition, is usually added to the flaked wheat middlings.

Further after flaking, about 5 to 8 weight percent of at least one fruit can be incorporated into the dried and flaked wheat. The more popular dry fruits that can be used in the invention process include apple, apricot, blackberry, boysenberry, cherry, current, plum, elderberry, fig, gooseberry, grape, guava, loganberry, nectarine, peach, pear, pineapple, quince, rasberry, strawberry and other flavors.

The flaked product of invention is not subjected to a toasting or roasting step. Also, an emulsifier does not have to be used in the process or product of the invention.

The flaked product generally has a moisture content of 12 to 14 weight percent. The flaked product is quite stable and can be stored in a sealed container for at least 12 months. It is believed that during preparation of the flaked product the starch is gelatinized, which halts enzymatic activity, and provides good stability and shelf life for the flaked product.

The flaked product can be made ready-to-eat by reconstituting in a bowl with hot water, milk or other suitable edible liquid containing water. Usually hot milk or water is used for reconstitution. Sugar or other sweetener, for example, can be added. The flaked product is in a ready-to-eat or instant form and is truly an "instant" wheat farina-like product which can be prepared in a bowl by the consumer without a cooking step. The flaked wheat product has excellent flavor and texture characteristics.

While not necessary, the ready-to-eat product can be reconstituted by cooking (boiling) for a minute or so. It is not necessary to have added disodium phosphate (e.g., 0.25 weight percent), although it can be used, to reduce the cooking time since reconstitution by cooking is only an option with the invention product.

The process of this invention can also be used to prepare instant, flaked, ready-to-eat cereal products from other than wheat farina. For example, cereal grains such as rice, barley, oats, rye, corn, millet, etc., can be used in the invention process. Such cereal grains should be used in a particulate form which has a particle size within the approximate particle size range of wheat farina.

EXAMPLE 1

A dry admixture of 1 weight percent of guar gum powder and 99 weight percent of wheat middlings was prepared. The dry admixture was sprayed with 13 weight percent of water. The wetted admixture was tempered with agitation for 25 minutes at a temperature of 35° C. The tempered material was cooked in a pressure cooker for about 12 minutes at 15 p.s.i. The size of the particles was increased to about 12 mesh during cooking. The average particle size (lumps and agglomerates included) was reduced to about 0.5 inch by means of grinding. The cooked product was then dried in a dryer to a moisture content of 14 weight percent. 0.8 weight percent of guar gum, based on the total weight of the dried composition, and the following ingredients wheat germ, sugar, calcium carbonate, reduced iron, partially hydrogenated soybean oil, niacin, BHA, vitamin A acetate, pyridoxine hydrochloride, thiamine mononitrate (vitamin B), riboflavin (vitamin $B_2$) and folic acid were then throughly admixed with the dried composition. The dried particles were then tempered at 32° C. and flaked using large steel flaking rolls. The flaked particles had a uniform moisture content of 13 weight percent. The flaked and mixed composition was readily reconstituted in a bowl by the additon of hot water to produce a breakfast cereal type of product that was quite appetizing in appearance, odor and taste.

EXAMPLE 2

Example 1 was repeated, except that the starting dry admixture contained 1.0 part by weight of guar gum, 3.0 parts by weight of sodium chloride, 96 parts by weight of wheat farina and minor amounts of flavoring agents. Also, reconstitution was done using warm milk.

Example 3 is a comparative example.

EXAMPLE 3

Part A

An instant breakfast cereal (flaked, cooked middlings) was prepared having the following composition:

| INGREDIENTS | lbs |
|---|---|
| Cleaned wheat middlings | 1500.0 |
| Fines[1] | 170.0 |
| Guar gum | 34.0 |
| Water (32 gal) | 267.3 |
| TOTAL (est. 26 percent moisture) | 1971.3 |

Note:
[1]This is an optional ingredient which is the fines of a cooked, flaked wheat middlings with guar gum added thereto that go through a no. 60 mesh.

1500 lbs. of cleaned raw middlings were weighed into a batch scale tank along with 170 lbs. of fines and 34 lbs. of guar gum. Middlings, fines and guar gum were conveyed to a mixer and mixed for 5 minutes. 32 gallons of water were sprayed into the blender. Mixing was done while the water was being added and for 10 min. after the water had been added. The wetted middlings were then conveyed to a pressure cooker. The middlings were cooked for 12 min. at 15 p.s.i. of steam pressure (294° F.). The start of the cooking was timed from when steam was introduced into the cooker. At the end of cooking period, the cooker was exhausted and the cooker was emptiied onto a take-away conveyor. The moisture content of the cooked material was approximately 26 percent. The cooked material was then conveyed by a cooling belt to a first lump breaker and then by another cooling belt to a second lump breaker. Then cooked material was conveyed by cooling and load leveling belt conveyor which regulated flow of material into two grinders with 5 screen round holes ½ inch in diameter to further reduce the size of the particles and insure more uniform and quicker drying. The material was then conveyed to the drier. The dried material was conveyed to a scalper with a #12 screen in it. This was conveyed by a screw and bucket elevator to a tempering bin where the batch was held for approximately one hour to equalize the moisture content. The overs were ground and recycled. The tempered material was then conveyed into the flaking rolls. The material was flaked to 52–54g/100 cc and was conveyed to a sifter. The sifting after flaking was through a No. 6 mesh and on a No. 60 mesh U.S. standard screens. The fines and overs were barreled, removed and reworked, while the good material was either barreled and removed or fed directly into production.

Part B

Part A of this example was repeated except that no guar gum was added to the middlings before the tempering, cooking etc., and flaking steps.

Part A of this example illustrates the invention; part B of this example is for comparison purposes. Upon reconstitution with hot water, the flakes of this invention (part A of this example) provided an instant breakfast cereal that had a better texture, that is, was softer, more creamy and more slippery, than that of part B of this example.

EXAMPLE 4

A fortification mixture which contained wheat germ, salt, sugar, calcium carbonate, reduced iron, partially hydrogenated soybean oil, niacin, BHA, vitamin A acetate, pyridoxine hydrochloride, thiamine mononitrate, riboflavin and folic acid (or, in other words, stabilized wheat germ, a vitamin premix, $CaCO_3$ and Fe) was prepared. 100 pounds of flaked, cooked middlings (93.9 percent) which had been processed according to this invention, and 6.55 pounds of the fortification mixture (6.1 percent) were continuously fed and blended in a blender to produce the finished product. The blended product was conveyed by a conveyor to the packaging machine where it was packed in individual serving portions at 1 oz. per packet. 10 packets were packed per carton.

This example also illustrates this invention. Upon reconstitution with hot water, the flakes of this example provided an instant breakfast cereal that had a better texture, that is, was softer, more creamy and more slippery, than that of part B of Example 3.

What is claimed is:

1. Dry, instant, cereal grain farina-like product in flake form produced by the process comprising:
   (a) admixing cereal grain farina material and 0.5 to 3 weight percent of guar gum in powder form, based on the total dry weight of the mixture of the guar gum and the cereal grain farina material;
   (b) impregnating homogeneous mixture (a) with a sufficient amount of water to saturate mixture (a);
   (c) tempering mixture (b) to produce a material at uniform moisture;
   (d) cooking tempered material (c) sufficiently at 110° C. to 120° C. to gel the starch present in the cereal grain farina, the average particle size of the mixture (c) being increased thereby;
   (e) reducing the average particle size of cooked material (d), cooked material (d) being in particular form;
   (f) drying particulate, cooked material (e);
   (g) tempering mixture (f) to provide a uniform mixture content throughout mixture (f); and
   (h) flaking, tempered particulate material (g) to form a dry product in flake form, the dry flake product being capable of being readily rehydrated to have the texture and flavor characteristic of cooked cereal grain farina.

* * * * *